Patented July 6, 1954

2,683,179

UNITED STATES PATENT OFFICE 2,683,179

PREPARATION OF PROPARGYL CHLORIDE

Harry D. Anspon, Easton, Pa., assignor to General Aniline & Film Corporation, New York, N. Y., a corporation of Delaware No Drawing. Application November 13, 1950,
Serial No. 195,470

4 Claims. (Cl. 260—654)

This invention relates to a process for the preparation of propargyl chloride, especially by a continuous vapor phase procedure.

Propargyl chloride has been prepared heretofore by liquid phase reaction of propargyl alcohol with pyridine and thionyl chloride, or with phosphorus trichloride. These processes employ relatively expensive reagents, and recovery of the desired product from the reaction mixture is inconvenient and costly. Such processes are therefore undesirable for commercial production. Hydrogen chloride, on the other hand, when passed into propargyl alcohol in the liquid phase, fails to yield any appreciable amount of propargyl chloride. As disclosed in my copending application, Serial No. 195,469, filed on November 13, 1950, vapor phase reaction of propargyl alcohol with hydrogen chloride in the presence of a large number of metal salt catalysts results in conversion of the propargyl alcohol to 2-chloroallyl alcohol, no propargyl chloride being produced.

It is an object of this invention to provide an economical and convenient procedure for the preparation of propargyl chloride, suitable for continuous operation.

In accordance with my invention, propargyl chloride is prepared by heating a mixture of propargyl alcohol and hydrogen chloride in the vapor phase to a temperature of 150 to 350° C. in a catalytically inert reaction zone, i. e., in the absence of catalysts such as metals or metal salts promoting formation of 2-chloroallyl alcohol, and preferably containing a porous catalytically inert packing offering an extensive surface to the gaseous reaction mixture to facilitate heat exchange and to promote intimate mixing of the reaction vapors. Catalytically reactive materials which are avoided in carrying out the process of this invention are especially salts of polyvalent and heavy metals which promote the formation of 2-chloroallyl alcohol to the exclusion of propargyl chloride. A suitable inert packing for the reaction zone is silica, especially silica gel, which is preferably purified of any traces of metal compounds contained therein. Glass can be used as the reaction vessel since the relatively small surface thereof exposed to the reaction mixture avoids any substantial catalytic effect. Fused silica is even better than glass for this purpose.

The reaction is conveniently effected by passing the mixed vapors of propargyl alcohol and hydrogen chloride through a reaction zone of the type described above while heating at a temperature within the range of 150 to 350° C. The vapors issuing from the reaction zone are advantageously cooled to condense the organic components thereof, and the condensate is then fractionally distilled to recover propargyl chloride therefrom.

The preferred procedure in accordance with my invention is illustrated in the following example, wherein parts are by weight unless otherwise indicated.

Example

A Pyrex glass tube, having an inside diameter of 18 mm., was packed for 22 inches of its length with silica gel (passing a screen with 10 meshes per linear inch) the tube being provided with an external electric resistance heating coil surrounding the packed portion, enclosed in a surrounding glass jacket. The silica gel was first dried by maintaining it under a reduced pressure of 3 mm. of mercury (absolute) for 16 hours, and then heating at 200° C. while passing a stream of dry nitrogen through the tube until no further water vapor was evolved. While maintaining the reaction tube at a temperature of 190 to 210° C., an equimolecular mixture of hydrogen chloride and propargyl alcohol vapor was passed through the tube at a space velocity of 13.7. (Space velocity, as employed herein, signifies the ratio of the calculated volume of the reaction mixture in gaseous form at 0° C. and 1 atmosphere absolute pressure, passing through the reaction zone per hour to the total volume of the reaction zone, e. g. the apparent volume of the packing.) The vapors issuing from the reaction zone were cooled to condense the organic components thereof, and the resulting condensate was cooled and fractionally distilled. From 110 parts of propargyl alcohol, 4.5 parts of a low boiling fraction were recovered, boiling from 53 to 57° C., consisting substantially entirely of propargyl chloride. Most of the remaining distillate was unreacted propargyl alcohol, accompanied by a minor proportion of 2-chloroallyl alcohol and still smaller amounts of 2,3-dichloropropene. The recovered propargyl alcohol and hydrogen chloride can be recycled for further reaction in the reaction zone.

An improvement in the yield of propargyl chloride can be effected by pre-extracting the silica gel or other packing with an acid such as hydrochloric or nitric acids to remove any traces of metal salts therein which otherwise tend to form 2-chloroallyl alcohol.

Increased conversion results upon employing a molecular excess of hydrogen chloride, e. g. up to 20 mols of hydrogen chloride per mol of propargyl alcohol, instead of the equimolecular mixture illustrated in the example. Inert gaseous diluents such as nitrogen can also be included in the reaction mixture, but this expedient is unnecessary and generally retards the desired reaction. While reaction temperatures within the range of 150 to 350° C. are suitable, a reaction temperature of 180 to 220° C. is preferred.

Production of propargyl chloride by the process just described is surprising, since it was found that no propargyl chloride was formed upon passing dry hydrogen chloride through liquid propargyl alcohol at a temperature adjacent its boiling point (i. e., 115° C.).

Variations and modifications which will be obvious to those skilled in the art can be made in the procedure hereinbefore described without departing from the scope or spirit of the invention.

I claim:

1. A process for the production of propargyl chloride, which comprises heating a gaseous mixture of hydrogen chloride and propargyl alcohol at a temperature of 150 to 350° C. in a catalytically inert reaction zone.

2. A process for the production of propargyl chloride, which comprises passing a gaseous mixture of hydrogen chloride and propargyl alcohol through a packed catalytically inert reaction zone, heated at a temperature of 150 to 350° C., and recovering propargyl chloride from the vapor issuing from the reaction zone.

3. A process as defined in claim 2, in which the reaction zone is packed with silica gel.

4. A process for preparing propargyl chloride, which consists in passing an equimolecular mixture of hydrogen chloride and propargyl alcohol in vapor form through a catalytically inert reaction zone packed with silica gel, at a temperature of 180 to 220° C., cooling the vapors issuing from the reaction zone to condense the organic components thereof, and fractionating the condensate to recover propargyl chloride therefrom.

References Cited in the file of this patent

UNITED STATES PATENTS

| Number | Name | Date |
|---|---|---|
| 1,937,269 | Ernst | Nov. 28, 1933 |

FOREIGN PATENTS

| Number | Country | Date |
|---|---|---|
| 503,716 | Germany | July 25, 1930 |
| 583,477 | Germany | Sept. 4, 1933 |

OTHER REFERENCES

Campbell et al., "Jour. Am. Chem. Soc.," vol. 60, pages 2682–4 (1938).

Campbell et al., "Jour. Am. Chem. Soc.," vol. 62, pages 1798–1800 (1940).